July 15, 1952     R. J. TENNIS     2,603,526
OYSTER TONGS

Filed Jan. 22, 1949

Inventor,
R. J. Tennis
By Mason, Fenwick & Lawrence
Attorneys

Patented July 15, 1952

2,603,526

UNITED STATES PATENT OFFICE 2,603,526

OYSTER TONGS

Robert J. Tennis, Carrollton, Va.

Application January 22, 1949, Serial No. 72,245

6 Claims. (Cl. 294—118)

This invention relates to devices for use in tonging oysters and the like, and is particularly directed to tongs having improved means for connecting the jaws to the handles.

In gathering oysters, tongs having long operating handles connected at their lower ends each to one jaw of a two-part gathering basket, have long been used. The tonger, usually standing in a boat, sinks the tongs in the water until the jaw portions are touching bottom. By manipulation of the handles, the tonger loosens the oysters from the bed while the jaws are open and then by operating the handles to close the jaws gathers up the oysters into the basket formed by the closed jaws. For purposes of strength, the handles are connected to the jaws near the bottom so that the individual wires making up the jaws of the basket may be secured to the handles to retain them in position and provide the necessary rigidity for the rough usage of digging and scraping the oysters from the bed. This hampers the operation to a great extent, and considerably reduces the capacity of the closed basket. The handles, being of wood, are of necessity of substantial dimensions to withstand the strain which is imposed upon them. The lower ends of the handles, projecting to or near the bottom of the jaws, provide inwardly projecting ribs which frequently catch oysters between them and thereby prevent the full closing of the jaws. Under these circumstances, the jaws being partially open, the oysters within the jaws spill out so that few if any oysters are raised to the surface. Even if the tongs are shifted and manipulated so that the lower edges of the jaws may be brought together, the space occupied by the lower portions of the handles within the jaws materially reduces the available space within the basket.

The object of the present invention is to provide improved means for attaching the jaws to the handles, so that the requisite strength is maintained, and yet the capacity of the basket is greatly increased.

A more specific object of the invention is to provide such means of attachment whereby the handles may stop short of the tops of the jaws, and the strain carried by relatively thin shanks which occupy little space within the oyster-carrying area of the basket.

Other objects of the invention will become apparent from the following description of one embodiment of the invention when taken in conjunction with the drawings which accompany and form a part of this specification.

Figure 2:
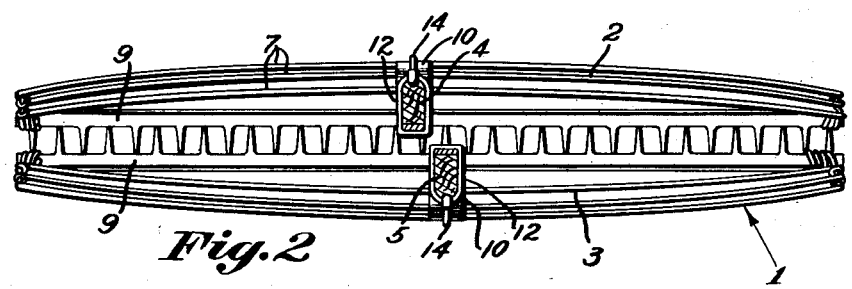
Figure 2 is a horizontal section taken on the line 2—2 of Figure 1, the jaws forming the basket being shown in top plan; and, Figure 3 is a vertical section through the basket-forming jaws taken substantially on the line 3—3 of Figure 1.
Figure 1:
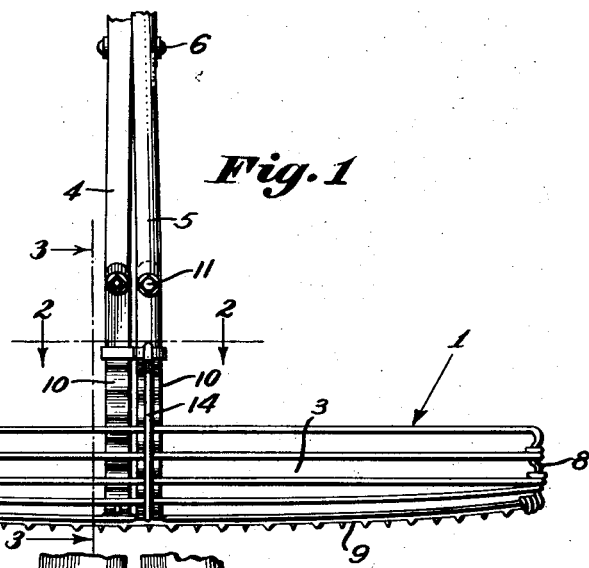
Figure 1 is a side elevation of tongs constructed in accordance with the present invention, the handles being broken away just above their pivotal point.

Referring to the drawings in detail, the tongs comprise the usual basket 1, composed of the jaws 2 and 3, the jaws being secured upon the lower ends of handles 4 and 5. The handles are pivotally connected in scissor-like arrangement by means of the pivot 6. It will be understood that the handles employed are sufficiently long to enable the tonger to reach bottom while standing in a boat, but, in order to enable the important features of the invention to be illustrated on a reasonable scale, the upper parts of the handles have not been shown.

The jaws forming the basket are shown as of conventional construction. They consist of a plurality of longitudinally extending, vertically spaced wires 7, the topmost wire having its ends down-turned as at 8 and the other wires having their ends secured to the down-turned portions 8. At the bottom, a toothed bar 9 extends the length of each jaw. The wire frame of each jaw is concave or dished both vertically and longitudinally to give it capacity to hold oysters. The teeth of the bars 9 of the two jaws are staggered so that the jaws will come together.

Figure 3:
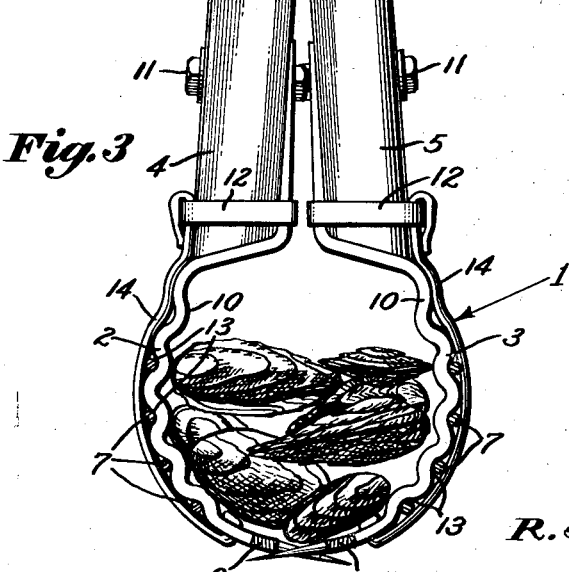

The invention consists in the particular manner of securing the jaws to the lower ends of the handles. Referring particularly to Figure 3 of the drawings, it will be seen that the handles terminate short of the tops of the jaws, and are attached to the jaws by means of shanks 10. The shanks are connected to the handles by means of bolts 11 and by loop 12 which closely surround the handles and the shanks, holding the shanks tightly against the handles and preventing the shanks from moving around the bolts 11. Shanks 10 have their corner portions bent, so that they are undulating or corrugated in effect, to form recesses 13 to receive the basket-forming wires 7 to hold the wires in proper vertically spaced position. A backer-wire 14 may be hooked under the loop 12 and extended downward to have its lower end fastened in an opening at the bottom of shank 10. Backer-wire 14 is in contact with the ridges of the undulating portion of shank 10 serving to hold wires 7 in the recesses, and, at the same time, serves as a brace, attached upon the opposite side of the handle from shank 12, to strengthen and stiffen the shank. The bottom end of the shank is welded or otherwise secured, to the toothed bar 9.

It will be noted from Figure 3 of the drawing that both the shanks 10 are bent at the bases of their respective handles, to underlie the handles. This brings the shank to the outside of the handle at a point above the top of the jaw.

Due to this arrangement, the shank, being of metal and therefore much thinner than the handle, extends along the inner side of the jaw occupying very little space and providing a basket of greatly increased capacity. There are no projecting portions, as in the conventional structure where the handles extend to a point substantially at the bottom of the basket, so that the tongs can be manipulated freely, with no chance of the oysters becoming wedged between extending portions of the handles and preventing the jaws from closing. The new structure, by providing seats for the basket wires, rigidly supports the wires as their mid-points so that the basket itself is materially strengthened.

While in the above one practical embodiment of the invention has been disclosed, it will be obvious to those skilled in the art to which it appertains that changes may be made from the precise structure shown within the scope of the appended claims.

What is claimed is:

1. Oyster tongs or the like comprising, a pair of crossed handles pivoted together, a pair of transversely elongated jaws which together form a basket to receive and raise oysters to the surface of the water, said jaws being positioned entirely below the bottom ends of said handles, and means to connect the jaws, one each to a handle, said connecting means comprising a strap depending from the handle in substantial alignment with the outside edge of the handle and conforming to the shape of the jaw to leave the capacity of the jaw unimpaired, and a backer wire connected to each handle and extending behind said jaws and connected to said straps near the bottom thereof.

2. Oyster tongs or the like comprising, a pair of crossed handles pivoted together, a pair of transversely elongated jaws which together form a basket to receive and raise oysters to the surface of the water, said jaws being positioned entirely below the bottom ends of said handles, means to connect the jaws, one each to a handle, said connecting means comprising a relatively thin strap bent to underlie the bottom of the handle and reversely bent to depend substantially in alignment with the outside edge of the handle, and a backer wire connected to each handle and extending behind said jaws and connected to said straps near the bottom thereof.

3. Oyster tongs or the like comprising, a pair of crossed handles pivoted together, a pair of transversely elongated jaws which together form a basket to receive and raise oysters to the surface of the water, said jaws being positioned entirely below the bottom ends of said handles, relatively thin straps attached to said handles and bent to underlie the bottoms of the handles and reversely bent and depending therefrom in substantial alignment each with the outside edge of its respective handle, each strap being secured at its lower end to one of said jaws and conforming to the shape of the jaws to leave the capacity of the jaws unimpaired, and a backer wire connected to each handle and extending behind said jaws and connected to said straps near the bottom thereof.

4. Oyster tongs or the like comprising, a pair of crossed handles pivoted together, a pair of transversely elongated jaws which together form a basket to receive and raise oysters to the surface of the water, said jaws being entirely below the bottom ends of said handles and being composed of a series of vertically spaced horizontal wires with a toothed bar from the bottom edge thereof, a metal shank secured at its top to the inner edge of each handle, a collar surrounding the lower end of said handle and said shank, said shank being bent to underlie the bottom of its handle and reversely bent to depend from said handle substantially in alignment with the outer edge of said handle, said shank being attached at its lower end to said toothed bar, the lower portion of said shank being bent to form recesses to seat the horizontal wires of said jaw to maintain said wires in proper spaced alignment, and a backer-wire secured at its upper end to said collar and at its lower end to said shank and extending along said shank on the opposite side of said wires to maintain said wires in the recesses of said shank and to strengthen said shank.

5. Oyster tongs or the like comprising, a pair of crossed handles pivoted together, a pair of transversely elongated jaws which together form a basket to receive and raise oysters to the surface of the water, said jaws being entirely below the bottom ends of said handles and being composed of a series of vertically spaced horizontal wires, straps attached to said handles and depending therefrom in substantial alignment each with the outside of its respective handle, each strap being secured at its lower end to one of said jaws, said strap having its lower portion bent to form a plurality of seats to receive the horizontal wires of the jaw to which it is attached, whereby the wires are supported and held in spaced relation, and a tie-wire secured to each handle, said tie-wires extending along said strap on the opposite side of said jaw wires and being attached to said strap near the lower end thereof, whereby said tie-wire serves to maintain said jaw wires in the seats of said strap and to strengthen said strap.

6. Oyster tongs or the like comprising, a pair of crossed handles pivoted together, a pair of transversely elongated jaws which together form a basket to receive and raise oysters to the surface of the water, said jaws being entirely below the bottom ends of said handles and being composed of a series of vertically spaced horizontal wires, straps, thinner than said handles, attached one each to the inner side of each handle, each strap being bent to underlie the bottom of its handle and reversely bent to depend from said handle in substantial alignment with the outside edge of said handle, said strap being attached at its lower end to one of said jaws, said strap having its lower portion bent to form a plurality of seats to receive the horizontal wires of the jaw to which it is attached, whereby the wires are supported and held in spaced relation, and a tie-wire secured to each handle, said tie-wires extending along said strap on the opposite side of said jaw wires and being attached to said strap near the lower end thereof, whereby said tie-wire serves to maintain said jaw wires in the seats of said strap and to strengthen said strap.

ROBERT J. TENNIS.

REFERENCES CITED

The following references are of record in the file of this patent:

UNITED STATES PATENTS

| Number | Name | Date |
| --- | --- | --- |
| 694,495 | Quinn | Mar. 4, 1902 |